United States Patent
Mukherjee et al.

(10) Patent No.: US 9,007,792 B2
(45) Date of Patent: Apr. 14, 2015

(54) ARRANGEMENT FOR TRANSMITTING POWER BETWEEN A DC POWER LINE AND AN AC POWER LINE

(75) Inventors: Subhasish Mukherjee, West Bengal (IN); Tomas Jonsson, Västerås (SE); Sasitharan Subramanian, Tamil Nadu (IN)

(73) Assignee: ABB Technology AG, Zurich (CH)

( * ) Notice: Subject to any disclaimer, the term of this patent is extended or adjusted under 35 U.S.C. 154(b) by 150 days.

(21) Appl. No.: 13/879,573

(22) PCT Filed: Oct. 15, 2010

(86) PCT No.: PCT/EP2010/065545
§ 371 (c)(1),
(2), (4) Date: Jun. 5, 2013

(87) PCT Pub. No.: WO2012/048754
PCT Pub. Date: Apr. 19, 2012

(65) Prior Publication Data
US 2013/0258726 A1    Oct. 3, 2013

(51) Int. Cl.
*H02M 7/48* (2006.01)
*H02M 1/12* (2006.01)
*H02M 1/14* (2006.01)
*H02M 7/537* (2006.01)
(Continued)

(52) U.S. Cl.
CPC ............... *H02M 7/537* (2013.01); *H02J 3/36* (2013.01); *H02M 7/483* (2013.01); *H02M 2007/4835* (2013.01); *Y02E 60/60* (2013.01)

(58) Field of Classification Search
USPC .................................. 363/40, 65, 67, 71, 74
See application file for complete search history.

(56) References Cited

U.S. PATENT DOCUMENTS

| 4,467,384 | A  | * | 8/1984  | Yuasa ........................ 361/19 |
| 6,330,170 | B1 | * | 12/2001 | Wang et al. ................ 363/37 |
| 6,445,599 | B1 | * | 9/2002  | Nguyen ....................... 363/25 |

(Continued)

FOREIGN PATENT DOCUMENTS

| DE | 102005040543 A1 | 3/2007 |
| EP |      1051799 A1 | 11/2000 |

(Continued)

OTHER PUBLICATIONS

Li et al., "Investigation of Power Supplies for a Piezoelectric Brake Actuator in Aircrafts", Conference Proceedings. IPEMC Aug. 14-16, 2006, Shanghai, China, pp. 1-5.

(Continued)

*Primary Examiner* — Emily P Pham
(74) *Attorney, Agent, or Firm* — Birch, Stewart, Kolasch & Birch, LLP

(57) ABSTRACT

An arrangement transmits power between a DC power line and an AC power line carrying a voltage having a number of phases. The arrangement includes a number of transformers, one for each phase and a number of power transfer modules, one for each phase, connected in series between the DC power line and ground, where each module includes a first branch including series connected converter cells and a second branch including series connected switching elements. The primary winding of a transformer is connected to a corresponding AC phase conductor of the AC power line and the secondary winding is connected between a midpoint of the first branch and a midpoint of the second branch of a corresponding power transfer module.

20 Claims, 3 Drawing Sheets

(51) Int. Cl.
*H02J 3/36* (2006.01)
*H02M 7/483* (2007.01)

(56) References Cited

U.S. PATENT DOCUMENTS

| | | | |
|---|---|---|---|
| 6,480,403 B1 | 11/2002 | Bijlenga | |
| 6,519,169 B1 | 2/2003 | Asplund et al. | |
| 6,954,366 B2 * | 10/2005 | Lai et al. | 363/71 |
| 8,300,438 B1 * | 10/2012 | Herbert | 363/69 |
| 2002/0141206 A1 * | 10/2002 | Brkovic | 363/24 |
| 2008/0205093 A1 | 8/2008 | Davies et al. | |
| 2008/0232145 A1 | 9/2008 | Hiller et al. | |
| 2008/0258692 A1 * | 10/2008 | Heinz et al. | 322/28 |
| 2011/0121774 A1 * | 5/2011 | Shimada | 318/729 |
| 2013/0070495 A1 * | 3/2013 | Jonsson et al. | 363/84 |

FOREIGN PATENT DOCUMENTS

| | | |
|---|---|---|
| WO | WO 99/40676 A1 | 8/1999 |
| WO | WO 2007/028349 A1 | 3/2007 |
| WO | WO 2010/088969 A1 | 8/2010 |

OTHER PUBLICATIONS

Liang et al., "Increasing Voltage Utilization in Split-Link, Four-Wire Inverters", IEEE Transactions on Power Electronics, IEEE Service Center, Piscataway, NJ., US, vol. 24, No. 6, Jun. 1, 2009, pp. 1562-1569.

* cited by examiner

ARRANGEMENT FOR TRANSMITTING POWER BETWEEN A DC POWER LINE AND AN AC POWER LINE

FIELD OF INVENTION

The present invention generally relates to voltage source converters. More particularly the present invention relates to an arrangement for transmitting power between a DC power line and an AC power line.

BACKGROUND

Direct Current (DC) power transmission systems are of interest to use in various situations, for instance when transferring electrical power over long distances.

It is known to transfer power between a DC power line and a three-phase alternating current (AC) power line with the three phases connected in series between the DC power line and ground or a negative DC bus.

In for instance U.S. Pat. No. 6,519,169 there are a number of power transfer modules connected in series between a DC power line and ground, where there is one such module per AC phase. Each module is made up of a two-level converter and an AC phase output is provided at the midpoints of two parallel branches of the module, where one branch includes switches with anti-parallel diodes and the other capacitors.

In recent years multilevel converters based on cascaded two-level cells have been used more frequently. These have the advantage of reducing or limiting the need for filtering equipment on the AC side.

In for instance WO 2007/028349 there is described a number of power transfer modules connected in series between a DC power line and ground. These modules are each made up two parallel branches, with each branch including a series connection of converter cells and with a transformer winding connected between the midpoints of the two branches.

The number of switching elements provided in this way is however fairly large and there would therefore be of interest to reduce this number.

One way of limiting the number of cells is described in the Session Paper "A New Hybrid Voltage-Sourced Converter for HVDC Power Transmission" by D. R. Trainer et al from the Cigré 2010 Sessions, Paris, France, 22-27 Aug. 2010. Here the power transfer modules are each made up of three branches, where two are made up of semiconductor switches and a third of two-level cells. Here a transformer winding is connected between the midpoints of the two semiconductor switch branches. WO 2010/088969 discloses the same type of arrangement.

SUMMARY OF THE INVENTION

The present invention is directed towards reducing the number of switching elements used in an arrangement for transmitting power between a direct current power line and an alternating current power line.

This object is according to the present invention achieved through an arrangement for transmitting power between a direct current power line and an alternating current power line carrying a voltage having a number of phases, said arrangement comprising:
  a number of transformers, one for each phase,
  a number of power transfer modules, one for each phase, connected in series between the direct current power line and ground or a negative direct current bus, where each module comprises
  a first branch including converter cells, and
  a second branch comprising series connected switching elements,
  wherein the primary winding of a transformer is connected to a corresponding alternating current phase conductor of the alternating current power line and the secondary winding is connected between a midpoint of the first branch and a midpoint of the second branch of a corresponding power transfer module.

The present invention has a number of advantages. The number of switching elements is kept very low as are the number of cells, thereby reducing the cost of the arrangement. There is no need for any direct current (DC) blocking capacitor in the first branches since the common mode DC voltage will not appear across the transformer winding. The switching losses will furthermore be very small and the number of output levels provided only depend on the number of cells connected in series.

BRIEF DESCRIPTION OF THE DRAWINGS

The present invention will in the following be described with reference being made to the accompanying drawings, where FIG. 1 schematically shows a DC power transmission system comprising a DC power line between an inverter and a rectifier as well as an arrangement for transmitting power between the DC power line and an AC power line, FIG. 2 schematically shows the arrangement from FIG. 1 in more detail, FIG. 3 schematically shows one power transfer module of the arrangement being controlled by a control unit and connected to an AC source via a transformer, FIG. 4 schematically shows the structure of a first type of voltage source converter cell, FIG. 5 schematically shows the structure of a second type of voltage source converter cell, and FIG. 6 schematically shows the structure of a third type of voltage source converter cell.

DETAILED DESCRIPTION OF THE INVENTION

In the following, a detailed description of preferred embodiments of the invention will be given.

Figure 1:
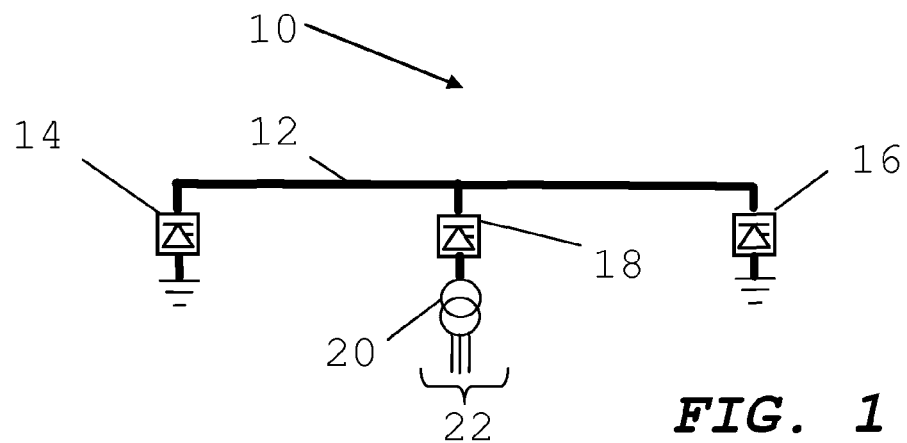

FIG. 1 shows a single line diagram of a simplified Direct Current (DC) power transmission system 10 comprising a first converter 14, a second converter 16 and a DC power line 12. The first converter 14 may here be connected to a first AC power line, which may be part of a first alternating current (AC) power system where energy is generated and the second converter 16 may be connected to a second AC power line, which may be a part of a second AC power system where energy is consumed.

The DC power line 12 may here be a power line covering a long distance for transferring power. One exemplifying distance is the distance of 500 km. It should here be realized that as an alternative, the DC power system 10 may include several more power lines and converters. The system may thus be a so-called DC grid as well. The DC power system is here a monopole system. It should however be realized that in some variations of the invention it is a bipole system instead, where there is a positive and negative DC bus.

To this DC power line 12 there is connected an arrangement for transmitting power between the DC power line 12 and a further AC power line 22. The arrangement here comprises a conversion unit 18, being connected to the further AC power line 22 via a transformer 20, which transformer is a three-phase transformer and which further AC power line 22 is a three-phase power line and therefore comprising three phase conductors. The further power line may here be a part of a further AC power system. The conversion unit 18 and transformer here make up an arrangement for transmitting power between a DC power line and an AC power line according to the invention.

The power transmitted across the DC power line 12 may as an example be in the range of 1200 MW, while the power provided or used by the further AC power line 22 may be in the range of 200 MW or lower. The power associated with the further AC system may therefore be less than 20% of the power of the DC system. The further AC power system may thus support less than 20% of the capability of the DC power system.

The further AC power system may as an example be the system of a city being passed by the first DC power line 12.

Because the power of this further AC system is much lower than the power of the DC system 10, it is possible to have the phases of the AC system connected in series to the DC power line 12.

Figure 2:
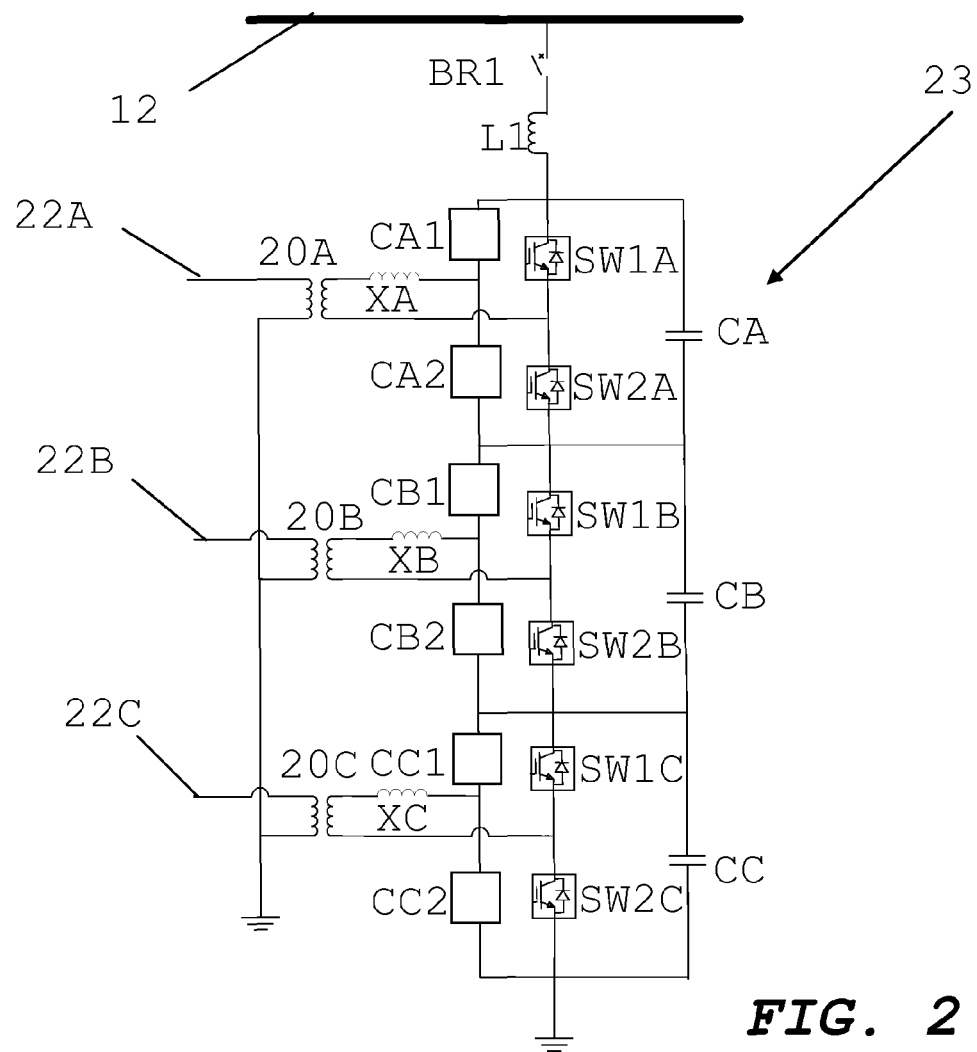

How this may be done according to the present invention is schematically shown in FIG. 2.

As the DC power system in this embodiment is a monopole system, the arrangement 23 comprises a number of power transfer modules connected between the DC power line 12 and ground.

Here there is one module for each phase. The modules are furthermore connected in series between the DC power line and ground. In a bipole system these modules would be connected in series between the DC power line and a negative DC bus.

In FIG. 2 there is also a first circuit breaker BR1, a DC circuit breaker, which is at one end connected to the DC power line 12 and at the other connected to a first reactor L1, which first reactor L1 is connected to a first of the modules.

Each module here comprises a first branch including series connected two-level converter cells and a second branch comprising series connected switching elements. Here each module also includes a third branch comprising a capacitor. All these branches are connected in parallel between a first and a second connection point, where the first connection point of the first module is connected to the first reactor L1, while the second connection point is connected to first connection point of the second module. The second connection point of the second module is in turn connected to the first connection point of the third module, while the second connection point of the third module is connected to ground. The parallel branches of the first module are thus connected in series with the parallel branches of the second module as well as in series with the parallel branches of the third module.

This means that in this example there is provided a first string of two-level cells including a first and second cell CA1 and CA2 of the first module, a first and second cell CB1 and CB2 of the second module and a first and second cell CC1 and CC2 of the third module. There is also provided a second string of switching elements comprising a first and second switching element SW1A and SW2A of the first module, a first and second switching element SW1B and SW2B of the second module and a first and a second switching element SW1C and SW2C of the third module. There is finally a third string of capacitors comprising the capacitors CA, CB and CC of the first, second and third modules. The switching elements may be realized in the form of IGBT (Insulated Gate Bipolar Transistor) transistors together with an anti-parallel diodes. It should however be realized that other types of switching elements may be used, such as Integrated Gate-Commutated Thyristors (IGCT), Bi-Mode Insulated Gate Transistors (BIGT), gate turn-off thyristors (GTO) and Forced Commutated Thyristors. Also other suitable thyristors may also be used. The strings thus run in parallel with each other between the DC power line and ground of the monopole system for forming the arrangement 23.

It should here be realized that the number of cells described are only exemplifying and that each first branch may include more than these two, for instance 10.

The first and second branches of each module has a midpoint. This means that half of the cells of a module branch are provided on one side of such a midpoint and the other half on the other side. This also means that the midpoint of the second branch has one switching element on one side and another on the other of the branch midpoint. Furthermore, as the AC system is a three phase system, the transformer 20 can be viewed as three separate phase transformers 20A, 20B and 20C, each having a primary winding and a secondary winding.

According to the invention one of the above-mentioned midpoints of a module is furthermore connected to one end of a corresponding secondary winding of a phase transformer, where the other midpoint is connected to another end of the secondary winding. As there are three modules and three phases this means that a first end of a secondary winding of a first phase transformer 20A is connect to the first branch of the first module between the first cell CA1 and the second cell CA2 and a second end of the same secondary winding is connected to the second branch between the first switching element SW1A and the second switching element SW2A. One of these connections furthermore includes a reactor. In this first embodiment the first end of the secondary winding of the first phase transformer 20A is connected to the midpoint of the first branch via a corresponding reactor XA. The primary winding of this first phase transformer 20A is then connected to a first phase conductor 22A of the further AC power line. In this embodiment a first end of the primary winding is connected to this first phase conductor 22A, while a second end of this primary winding is connected to ground. Similarly a first end of a secondary winding of a second phase transformer 20B is connect to the first branch of the second module between the first cell CB1 and the second cell CB2 via a corresponding reactor XB and a second end of this secondary winding is connected to the second branch between the first switching element SW1B and the second switching element SW2B. The primary winding of this second phase transformer 20B is then connected to a second phase conductor 22B of the further AC power line in the further AC system and here the first end of this primary winding is connected to the second phase conductor 22B, while the second end is connected to ground. Likewise a first end of the secondary winding of a third phase transformer 20C is connected to the first branch of the third module between the first cell CC1 and the second cell CC2 via a corresponding reactor XC and a second end of this secondary winding is connected to the second branch between the first switching element SW1C and the second switching element SW2C. The primary winding of this third phase transformer 22C is then connected to a third phase conductor 22C of the further AC power line. In this embodiment a first end of this primary winding is connected to this first phase conductor 22C, while a second end is connected to ground. In this embodiment the primary windings of the phase transformers are wye-connected. It should be realized that as an alternative they can also be delta-connected.

Figure 3:
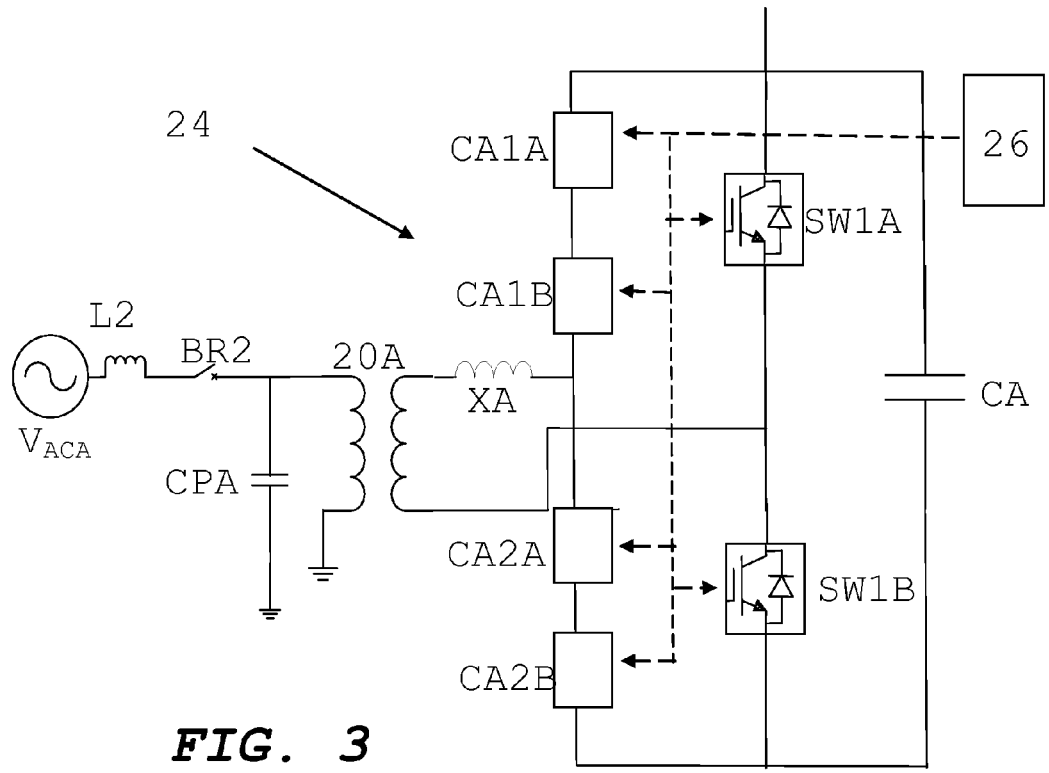

FIG. 3 schematically shows the first module 24 being connected to the first phase transformer 20A. Here the first module is shown as having four cells CA1A, CA1B, CA2A and CA2B, with two on each side of the first branch midpoint, with this midpoint being connected to the secondary winding of the transformer 20A via the reactor XA. In this figure there is also an AC side filter CPA connected in parallel with the primary winding of the first phase transformer 20A. The first end of the transformer primary winding is furthermore connected to the further AC system via a series connection of a second circuit breaker BR2 and an AC breaker. The further AC system is furthermore shown as providing a voltage source $V_{ACA}$ for this first phase together with a second reactor L2. Furthermore there is also shown a control unit 26 which controls the switching of the cells CA1A, CA1B, CA2A, CA2B and the switching elements SW1A and SW1B.

The second and third modules would here normally include the same components in the same positions and in the same number as the first module.

It should be realized that the control unit 26 may also control the second and third modules. As an alternative it is also feasible that these modules have their own control units.

Figure 4:
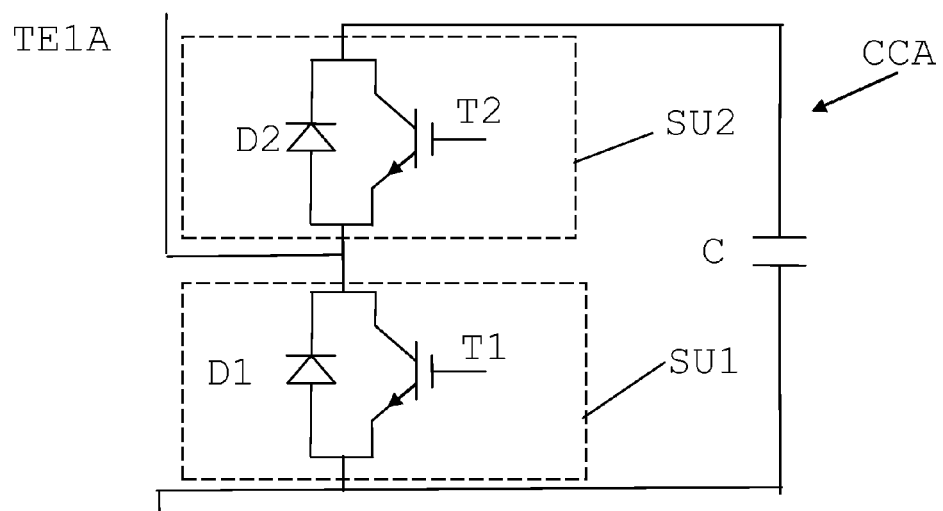

FIG. 4 schematically shows a first type of converter cell CCA that may be used in the arrangement. The cell CCA is a half-bridge converter cell, also denoted a two-level converter cell, and includes an energy storage element, here in the form of a capacitor C, which is connected in parallel with a first group of switching units. The switching units in the first group are connected in series with each other. The first group here includes a first switching unit SU1 and a second switching unit SU2 (shown as dashed boxes), where each switching unit SU1, SU2 may be realized in the form of a transistor that may be an IGBT (Insulated Gate Bipolar Transistor) together with an anti-parallel diode. It is possible to use any of the above described switching elements in the cells instead of IGBTs. The first switching unit SU1 thus includes a first transistor T1 together with anti-parallel first diode D1. The second switching unit SU2 includes a second transistor T2, with an anti-parallel second diode D2. In FIG. 4 the diode D2 of the second switching unit SU2 is oriented upwards in the figure, which is towards the capacitor C, and connected in parallel between emitter and collector of the second transistor T2. The second switching unit SU2 is connected in series with and followed by the first switching unit SU1 that has the first diode D1 with the same orientation as the second diode D2 and connected in parallel with the first transistor T1.

The cell has a first connection terminal TE1A and a second connection terminal TE2A, each providing a connection for the cell to the first branch. In this first type of cell the first connection terminal TE1A more particularly provides a connection from the first branch to the junction between the first and the second switching unit SU1 and SU2, while the second connection terminal TE2A provides a connection from the first branch to the junction between the first switching unit SU1 and the capacitor C. These connection terminals TE1A and TE2A thus provide points where the cell can be connected to the first branch.

A power transfer module thus includes a first branch having a suitable number of such cells in cascade with each other.

A module as shown in FIG. 3 employing cells of the first type may for instance be obtained through connecting a first connection terminal of a first cell CA1A to the DC line via the first reactor and first DC breaker (not shown), connecting a first connection terminal of the second cell CA1B of the first module to the second connection terminal of the first cell CA1A, connecting a first connection terminal of a third cell CA2A to the second connection terminal of the second cell CA1B, connecting a first connection terminal of a fourth cell CA2B to the second connection terminal of the third cell CA2A and finally connecting the second terminal of the fourth cell CA2B to the first connection point of the second module. This cell provides a voltage contribution being either zero or a voltage with one type of polarity, which in this case is a positive contribution.

Figure 5:
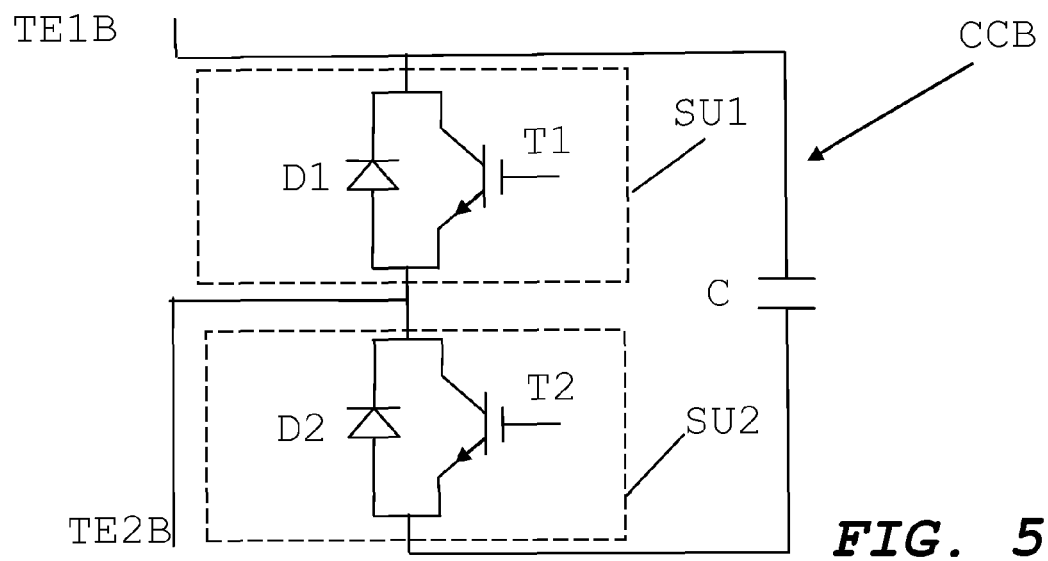

FIG. 5 schematically shows a second type of half-bridge converter cell CCB having the same type of components as the first type and being interconnected in the same way. However, here the first switching unit SU1 is followed by the second switching unit SU2. There is also in this second type of cell CCB a connection terminal TE2B, a second connection terminal, which provides a connection between the branch and the connection point between the first and the second switching units SU1 and SU2 as well as a connection terminal, a first connection terminal TE1B, which provides a connection between the branch and the junction between the first switching unit SU1 and the capacitor C. This type of cell provides a voltage contribution being either zero or with a voltage having the same polarity of the voltage contribution provided by the first type of cell.

Figure 6:
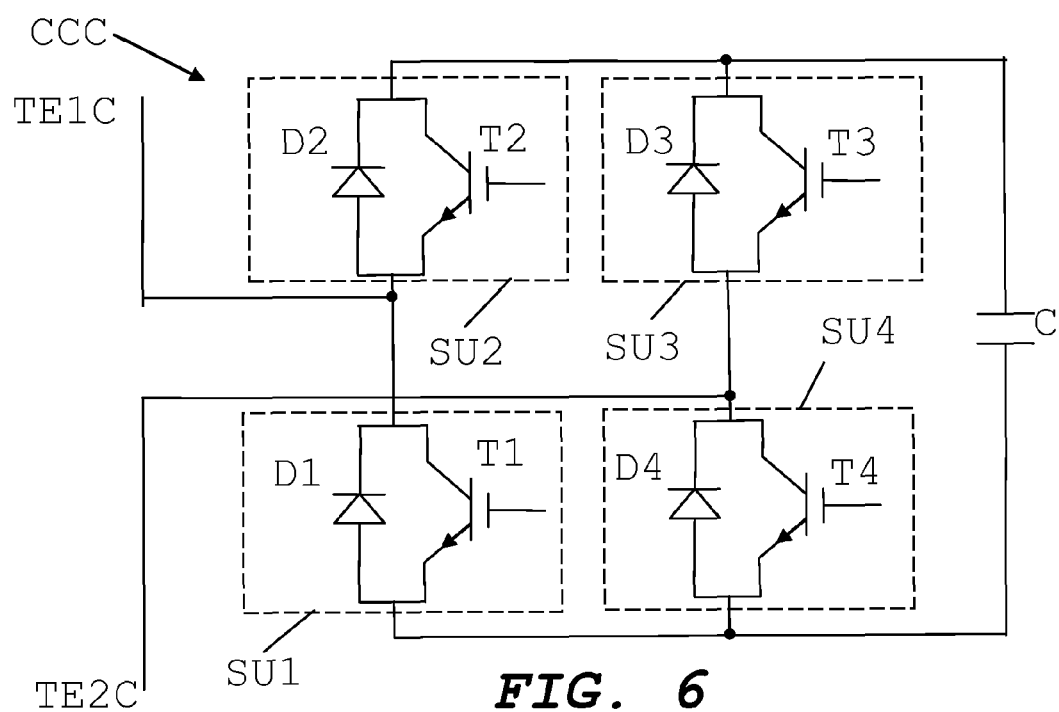

FIG. 6 schematically shows a third type of converter cell CCC including the same type of components having the same orientation in the same way as in the first type of cell, i.e. a first and a second switching units SU1 and SU2 each including a first and a second transistor T1 and T2 with anti-parallel first and second diodes D1 and D2 in a first group of switching units provided in parallel with an energy storage element, also here realized as a capacitor C. However here there is also a second group of switching units connected in series with each other. This second group is here connected in parallel with the first group as well as with the energy storage element. The second group here includes a third and a fourth switching unit SU3 and SU4, provided through a third transistor T3 with anti-parallel third diode D3 and through a fourth transistor T4 with anti-parallel fourth diode D4 having the same orientation as the first and second diodes. This second group is thus provided in a further branch in parallel with the capacitor C. The third and fourth switching units are here provided in the same way as the first and second switching units of the second type of cell. As in the first type of cell a first connection terminal TE1C is here provided at the connection between the first branch and the junction between the first and the second switching units SU1 and SU2. The second connection terminal TE2C is here provided in the same way as the second connection terminal in the second type of cell. In this third type of cell the second connection terminal TE2C thus provides a connection between the first branch and the junction between the third and fourth switching elements SU3 and SU4.

As opposed to the first and second types of cells, this cell CCC is a full-bridge cell providing a voltage contribution being zero, a positive voltage contribution or a negative voltage contribution.

The functioning of the arrangement according to the invention will now be described in more detail with reference being made to FIG. 3. Here it is initially assumed that the first type of cell is used. The DC capacitors of which only the DC capacitor of the first module is shown in FIG. 3, have a dual functionality, where the first function is to divide the DC voltage on the DC line 12 so that one third of the power line DC voltage is used for supplying power to a corresponding AC phase. The second function will be described shortly.

The control unit 26 controls the switching elements SW1A, SW1B and the cells CA1A, CA1B, CA2A and CA2B, for converting AC power to DC power or vice versa. The exemplifying arrangement may here be operated in two power directions. The control typically involves generating control signals by the control unit 26 in known fashion based on PWM modulation, and supplying these control signals to the cells CA1A, CA1B, CA2A, CA2B and switching elements SW1A and SW1B. The actual transfer of power is performed using the arrangement and each phase module is used for providing one AC phase, where the phase voltages are shifted in phase from each other by one hundred and twenty degrees.

For a given phase, such as a first phase provided by the first module 24, the control unit 26 controls the second switching element SW1B of the first module to be switched on while controlling the cells CA1A, CA1B, CA2A and CA2B to form a voltage varying in time, where the variation is from zero to a peak value corresponding to the voltage across the capacitor CA and then back to zero. In this first example the peak value is a positive peak value. In the first branch some cells are bypassed (through providing a zero voltage contribution) and others are connected into the branch (providing a voltage contribution with a positive polarity) in order to provide this variation. They are thus controlled to provide a sinusoidal half cycle in order to represent half of an AC voltage cycle. This varying voltage is applied on the first end of the secondary winding of the first phase transformer 20A. At the same time the second end of the transformer has a "zero" voltage in relation to the capacitor CA (corresponding to the voltage across both the capacitors CB and CC) due to the second switching element SW1B being turned on. It is therefore clear that there will be a voltage across the secondary winding of the first phase transformer that varies from zero to the positive peak value and back to zero.

If then the first switching element SW1A is turned on while the second switching element SW1B is turned off, which is done as the voltage across the first end of the secondary winding is zero, and thereafter the voltage over the first branch is varied in the same way as described above, the secondary winding experiences a voltage varying from zero to the peak value, however now with a negative polarity, and then back to zero.

It can therefore be seen that the secondary winding of the phase transformer 20A experiences an AC voltage.

With this type of control the capacitor CA has a number of uses. In addition to being used for voltage dividing purposes it is also used for switching the polarity of the AC voltage. The capacitor furthermore provides a low reluctance path for the switches SW1A and SW1B during commutation. The switching performed is also economical in that each switching element in the second branch is only switched two times per fundamental cycle, one turn on and one turn off.

The second and third modules are operated in the same way in order to obtain a three-phase AC voltage.

The cells used in the above described example were cells of the first type. It is possible to use also cells of the second type shown in FIG. 5. Then the cells will provide a voltage contribution to the phase transformer that varies between zero and a negative peak value. In this case the switching elements are operated in the opposite order than what was described above. However, the end result is the same, the provision of a sinusoidal AC voltage. The switching losses are thereby kept low. It is also possible to use cells of the third type shown in FIG. 6.

Here it should be mentioned that the control unit may control the arrangement to inject third harmonic zero sequences in the conversion. These raise the efficiency of the conversion performed in the arrangement. The third harmonic is injected in the converter by control action. With a suitable connection of the transformer, for instance using delta connection or a grounding if the start point is floating, it is possible to remove these harmonics before they reach the AC system.

The circuit breakers are used for isolating the arrangement from the further AC power line and the DC power line in case of a fault, such as in case of a ground fault.

The arrangement according to the invention has a number of advantages. The number of switching elements are kept very low as are the number of cells, thereby keeping the cost of the arrangement low. There is also no need for any DC blocking capacitor in the first branches since the common mode DC voltage will not appear across the transformer winding. Because the number of switching pulses for the series connected switching elements are one and the switching occurs at every zero crossing of AC output voltage, switching losses will be very small. The DC capacitors provide a path for the AC current. Thus the AC current is shared between the upper and lower cells in both half cycles. The DC capacitors offer a low inductance path for the communication current of the switches. They furthermore provide the necessary voltage grading between the three power transfer modules. A When cells of the third type are used, they can additionally be controlled to provide DC fault current limitation.

The control unit may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter.

From the foregoing discussion it is evident that the present invention can be varied in a multitude of ways. It shall consequently be realized that the present invention is only to be limited by the following claims.

The invention claimed is:

1. An arrangement for transmitting power between a direct current power line and an alternating current power line carrying a voltage having a number of phases, said arrangement comprising:

a number of transformers, one for each phase, a number of power transfer modules, one for each phase, connected in series between the direct current power line and ground or a negative direct current bus, wherein each of the number of power transfer modules comprises:

a first branch including cascaded converter cells, each of the cascaded converter cells comprising an energy storage element connected in parallel with a first group of switching units, wherein all the cascaded converter cells providing a voltage contribution of a corresponding one of the number of power transfer modules is provided in this first branch, and a second branch comprising switching elements that are connected in series, wherein the first branch and the second branch are connected in parallel between a first connection point and a second connection point of the corresponding one of the number of power transfer modules, a primary winding of a corresponding one of the number of transformers is connected to a corresponding alternating current phase conductor of the alternating current power line, and a secondary winding of the corresponding one of the number of transformers is connected between a midpoint of the first branch and a midpoint of the second branch of the corresponding one of the number of power transfer modules.

2. The arrangement according to claim 1, wherein each of the number of power transfer modules further comprises a capacitor in parallel with the branches.

3. The arrangement according to claim 1, wherein each of the number of power transfer modules further comprises a reactor between one of said midpoint of the first branch and said midpoint of the second branch and the secondary winding of the corresponding one of the number of transformers.

4. The arrangement according to claim 1, further comprising a control unit configured to control switching of the cascaded converter cells and switching of the switching elements.

5. The arrangement according to claim 4, wherein the control unit, when controlling switching of the cascaded converter cells and switching of the switching elements, is configured to control the cascaded converter cells to have a variation between zero and a peak voltage in one half period and to control the switching elements to change the polarity of the variation.

6. The arrangement according to claim 4, wherein the control unit in control of the cascaded converter cells and the switching elements is configured to add zero sequence third harmonics to a fundamental AC frequency.

7. The arrangement according to claim 1, wherein the cascaded converter cells and switches are configured to be controlled to add zero sequence third harmonics to a fundamental AC frequency.

8. The arrangement according to claim 6, wherein the number of transformers are delta-connected.

9. The arrangement according to claim 1, further comprising a first circuit breaker connected between the direct current power line and the number of power transfer modules and second circuit breakers between said number of transformers and the alternating current power line.

10. The arrangement according to claim 1, wherein the cascaded converter cells are half-bridge converter cells.

11. The arrangement according to claim 1, wherein the cascaded converter cells are full-bride converter cells.

12. The arrangement according to claim 2, wherein each of the number of power transfer modules further comprises a reactor between one of said branch midpoints and the secondary winding of the corresponding one of the number of transformers.

13. The arrangement according to claim 2, further comprising a control unit configured to control switching of the cascaded converter cells and switching of the switching elements.

14. The arrangement according to claim 3, further comprising a control unit configured to control switching of the cascaded converter cells and switching of the switching elements.

15. The arrangement according to claim 5, wherein the control unit in control of the cascaded converter cells and the switching elements is configured to add zero sequence third harmonics to a fundamental AC frequency.

16. The arrangement according to claim 2, wherein the cascaded converter cells and the switching elements are configured to be controlled to add zero sequence third harmonics to a fundamental AC frequency.

17. The arrangement according to claim 3, wherein the cascaded converter cells and the switching elements are configured to be controlled to add zero sequence third harmonics to a fundamental AC frequency.

18. The arrangement according to claim 4, wherein the cascaded converter cells and the switching element are configured to be controlled to add zero sequence third harmonics to a fundamental AC frequency.

19. The arrangement according to claim 5, wherein the cascaded converter cells and the switching elements are configured to be controlled to add zero sequence third harmonics to a fundamental AC frequency.

20. The arrangement according to claim 6, wherein the cascaded converter cells and the switching elements are configured to be controlled to add zero sequence third harmonics to a fundamental AC frequency.

* * * * *